UNITED STATES PATENT OFFICE 1,977,322

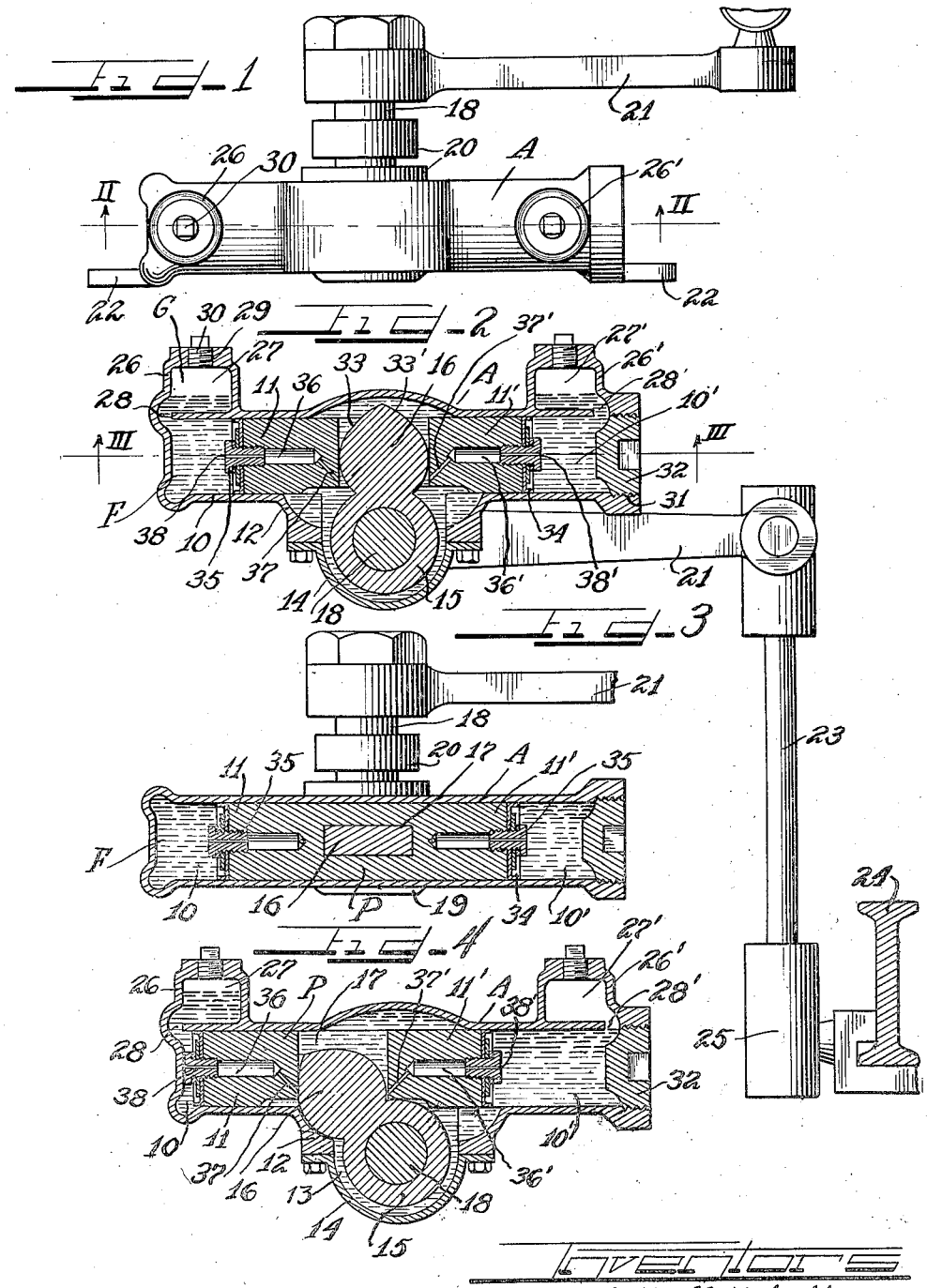

SHOCK ABSORBER

Richard S. M. Mitchell and Gertrude Albin Mitchell, Detroit, Mich., assignors of fifteen per cent to A. H. Golden, Stamford, Conn.

Application January 28, 1931, Serial No. 511,791
Renewed March 8, 1934

6 Claims. (Cl. 188—88)

This invention relates to shock absorbers adaptable particularly for application to automotive vehicles between the vehicle chassis and the axle.

An important object of the invention is to utilize an elastic gas such as air, and the resistance of such gas to volume change, for retarding to a greater or less degree the relative movement between the members of a shock absorber which are connected respectively with the vehicle chassis and the axle so that the operation of the vehicle spring is correspondingly modified and the shock of movement thereof absorbed.

A further object of the invention is to provide a shock absorber structure comprising a cylinder element and a piston element, and a mobile inelastic element such as oil which is displaced by the piston element and whose displacement is resisted by the compression or expansion of confined elastic gas.

Still another object of the invention is to provide an arrangement in which, when a vehicle is traveling over a comparatively smooth road way free of pronounced sudden bumps and depressions, and the amplitude of the piston oscillation is small, the confined elastic gas will be changed in volume coincidentally with the piston vibration, and the resistance to slight volume change will not materially interfere with the oscillations of the piston and the normal operation of the vehicle springs, but, under more pronounced relative movement between the chassis and axle, and greater movement of the piston, the volume change of the elastic gas will be to a correspondingly greater degree to accordingly resist and retard the movement of the piston and the vehicle springs to gradually check such movement and absorb the shock.

Another object is to so proportion the normal volume of the confined elastic gas relative to the available movement of the piston element within the cylinder element that the piston may move through a predetermined range within the cylinder without sufficiently changing the volume of the gas for producing sufficient resistance for materially interfering with the movement of the piston, but so that with movement of the piston beyond such range the volume change of the gas will develop a rapidly increasing resistance to the piston movement.

Another object of the invention is to provide for limited flow of liquid from one side of the piston to the other so as to cause the volume change of the elastic gas to be more gradual and to thereby prevent too sudden checking of abnormal relative movement between the chassis and axle, said fluid passage serving also to equalize or neutralize the resistance at opposite sides of the piston when the piston comes to rest or is reversing its direction of movement.

The above specified and other features of the invention are incorporated in the structure shown on the drawing, in which drawing Figure 1 is a plan view of the shock absorber structure;

Figure 2 is a section on plane II—II of Figure 1;

Figure 3 is a section on plane III—III of Figure 2; and

Figure 4 is a sectional view similar to Figure 2 showing an extreme position of the piston within the cylinder.

The frame A for housing the shock absorbing means may be in the form of a casting and provides at its ends the cylinder sections 10 and 10' for receiving respectively the plunger ends 11 and 11' of a cylindrical plunger structure P.

Between the cylinder sections the frame is deflected downwardly as indicated at 12 to leave a space 13 below the plunger structure. The deflected part 12 detachably receives a cap or closure 14 and this cap and the space 13 receive the hub 15 having an extension or wing forming a cam 16 which extends upwardly into the rectangular vertical passage 17 through the plunger structure. The hub 15 is rigidly secured to a shaft 18 which extends transversely through the frame and is journalled in the sides thereof. As shown in Figure 3 the inner end of the shaft journals in a boss 19, and at the other side of the frame it journals in a stuffing box structure 20. The outer end of the shaft has secured thereto the lever 21. At its inner side the frame A has suitable lugs 22 whereby it may be secured against the side of a vehicle chassis in a manner well understood in the art, the lever 21 being connected by a link 23 with the axle 24 of the vehicle, the connection of the link with the axle being preferably by means of a swivel or knuckle connection 25.

Above the cylinder sections 10 and 10' the frame has enlargements 26 and 26' providing chambers 27 and 27' respectively which communicate with the cylinder sections through ports 28 and 28' respectively. The upper walls of the chamber forming enlargements 26 and 26' have openings 29 through which fluid such as oil may be filled into the cylinders and the space in the frame between the cylinders, the normal level of such fluid being preferably a short distance above the ports 28 and 28' so that there is sufficient space left in the chambers 27 and 27' above the fluid for an elastic gas G such as air. After filling in the fluid the openings 29 may be closed by suitable plugs 30.

One end of the frame A has preferably an opening 31 for the entrance of a suitable tool for accurately boring the cylinder sections, and this opening can then be readily closed by a threaded plug 32 after the plunger structure has been inserted. The removable cap 14 permits the shaft with the cam supporting hub thereon to be readily inserted into the frame with the cam extending into the slot 17 of the plunger structure. The major portion of the cam is circular forming a substantially cylindrical cam surface, but at the upper end of the cam the cylindrical sides deflect to form tangential or flat faces 33 and 33' for a purpose to be specified hereinafter.

As the shaft 18 oscillates during relative movement between the chassis and the axle, the cam will swing laterally, and by its engagement with the slot 17 the plunger structure will be reciprocated laterally in the cylinder 10 to cause displacement of the fluid therein. To prevent leakage between the plunger and the respective cylinder walls each plunger end is provided with a leather washer 34 in the well known manner, each washer being held in place by a screw 35. These screws thread into the outer ends of the bores 36 and 36' in the plunger ends 11 and 11' respectively, these bores extending short of the cam receiving slot 17. At its inner end the bore 36 is connected by a port 37 with the slot 17 and the inner end of the bore 36' is connected by a port 37' with the slot 17, the bores slanting downwardly as shown so that their inner ends may be closed by the engagement therewith of the flat faces 33 or 33' on the cam when the cam is swung to one extreme position or the other by the rotating shaft. Extending through the screws 35 which hold the leather washer to the outer ends of the plunger sections are the restricted passageways or orifices 38 and 38' respectively. These restricted passageways together with the plunger bores 36 and 36' and the ports 37 and 37' and the slot 17, form a restricted by-pass or relief passage for fluid flow from one cylinder section to the other, and such relief pass is open except when the cam is swung into relatively extreme position at one side or the other at which time one of the faces 33, 33' will be against the inner end of the corresponding port 37 and 37', such port and consequently the relief pass being then closed against the flow of fluid therethrough from one cylinder into the other.

In Figure 4 the parts are shown in their final position, the pass having been closed for a considerable portion of the final travel of the piston 11.

In the operation of our device, the fluid F forms a mobile incompressible and inelastic medium for transmitting the movements of the plunger structure to the gas in the chambers 27 and 27'. In other words, the fluid serves as a mobile plunger extension for contacting with the gas volume to cause compression thereof. The plunger structure must of course be capable of a maximum distance of movement by the cam in response to relative displacement between the chassis and the axle. The volume of gas in each of the chambers 27 and 27' must be such as to afford the desired resistance to compression and consequently resistance to movement of the plunger to afford the desired degree of retardation throughout the range of movement of the plunger, from small distances of movement up to maximum distance of movement. The interposed fluid permits of such relationship of the compression degree to the distance of travel of the plunger.

In Figure 2 the plunger structure is shown centrally positioned within the cylinder structure and this may be the position under normal load of the vehicle. As the vehicle travels over comparatively smooth roads there will be comparatively slight relative movement between the vehicle chassis and the axle and the oscillation amplitude of the cam and the plunger is small. These short distances of travel of the plunger are communicated to the gas in the gas chambers through the mobile fluid and causes only very slight compression of the gas volumes so that the resistance to the oscillation of the plunger is practically negligible and the vehicle springs may function normally without interference. With the arrangement shown when the plunger travels in one direction, say toward the left, (Figure 2) the gas in chamber 27 will be slightly compressed and the gas in chamber 27' will be slightly expanded, such compression and expansion resisting the movement of the plunger. However, as just above stated, such resistance does not materially interfere with the normal functioning of the vehicle spring where the oscillations of the plunger are of short amplitude. During these short rapid oscillations there will be very little fluid flow, if any, through the relief pass owing to the restricted passageways 38 and 38' so that during the shorter oscillations of the plunger the gas will function to cushion and absorb any smaller shocks which might tend to occur during travel of the vehicle.

Suppose now that a wheel of the vehicle strikes an obstruction so that the wheel is suddenly struck upwardly toward the chassis, the plunger will be moved a corresponding distance to the left by the cam and a greater volume of fluid is forced by the plunger with heavier pressure against the gas in the chambers 27 and the gas in chamber 27' will be subjected to a corresponding expansion. After initial compression or expansion of the gas, this resistance to compression or expansion will rapidly increase and the tendency will be to correspondingly rapidly retard and check the plunger movement. However, fluid will be forced from the cylinder section 10 to the section 10' against the resistance of restricted passageways 38 and 38' in the plunger structure, this relief or bleed effect counteracting the compression and expansion resistance of the gas to a sufficient degree to cause the plunger to be more gradually retarded and resisted. If the relative movement of the axle and chassis is sufficient to cause the cam to be swung well to the end of its travel the flat face 33 of the cam will come into closure engagement with the port 37 to shut off further escape of fluid from the cylinder section 10 and then the final movement between the chassis and axle will be checked entirely by the resistance to final compression of the gas in chamber 27.

After the upward thrust of the wheel and consequent deflection of the vehicle spring has been thus retarded and checked by the shock absorber device the spring will tend to relax and throw the vehicle body upwardly. When this movement starts the cam will be swung to shift the plunger toward the right (Figure 2) and this movement is assisted by the expansion of the gas in chamber 11 and contraction of the gas in chamber 27', and as soon as the port 37 is released by the receding cam this gas pressure and expansion will force fluid through the relief pass with a tendency to equalize the resistance in the cylinders 10 and 10', but before the spring recoil has gained much headway the shifting plunger causes the gas in chamber 27' to be put under compression and the gas in chamber 27 under expansion, and resistance to the recoil movement of the spring begins and the resistance to recoil increases as the expansion and compression in the respective gas chambers increases. In order that the retardation and ultimate check may not be too sudden the fluid flows through the restricted passageways 38 and 38' from the cylinder 10' to the cylinder 10, and if the recoil is not checked before the cam closes the port 37', this port will be eventually closed so that the final check is taken care of by the final compression of the gas in chamber 27'. The rebound of the spring is thus effectively retarded and absorbed.

The release pass including the restricted passages 38 and 38' serves the further purpose of permitting a neutral start of the plunger from any position within the cylinder. For example, suppose that a load above that of normal enters the vehicle, the cam will be swung to shift the plunger in the corresponding direction, to the left (Figure 2). The resistance imposed on the plunger will be quickly neutralized by the flow of fluid from the cylinder 10 through the relief pass to the cylinder 10' so that the gas in the chambers 27 and 27' will be relieved of compression and expansion respectively. Now, when the car starts to travel the plunger may oscillate through small amplitudes while the car travels over comparatively smooth roadway and the gas in the chambers will be compressed and expanded respectively but without affording sufficient resistance to interfere with the normal operation of the vehicle spring. If an obstruction in the form of a bump or a depression is suddenly encountered the plunger will be shifted a correspondingly greater distance and then the increased compression and expansion of the gas modified by the flow of fluid through the relief pass, will cause such abnormal condition to be met and the abnormal movement gradually checked and shock absorbed in the same manner as has been already described.

It will be noted that as the relative movement between the chassis and axle increases the leverage movement of the cam against the plunger will become greater in proportion to the leverage movement of the arm 21 which decreases as the arm is swung from horizontal position to inclined position (Figure 2). Therefore, the resistance to plunger movement increases as the distance of travel of the plunger increases and this increase in leverage assists the gas and the fluid flow in effectively checking and absorbing shocks without abruptness.

In our improved shock absorber the volume change of the gas is depended upon in the main to absorb excess vehicle spring energy and prevent shocks. The flow of fluid through the relief pass merely modifies the resistance effects of the gas. The gas is always effective and operates at all times to resist and check the movement of the plunger in accordance with the degree of movement of the plunger and consequently the degree of movement between the chassis and axle of the vehicle. Efficient shock absorption is accomplished without the use of valves of any kind, or springs. All the relatively movable parts within the frame A are adequately lubricated by the fluid F.

We have shown one practical embodiment of the various features of our invention but we do not desire it to be limited to the details shown as changes and modifications may be made in construction, arrangement and operation without departing from the scope and spirit of the invention as outlined in the appended claims.

We claim as follows:

1. In a device of the class described, the combination of a cylinder containing an inelastic fluid, a piston operable in said cylinder, a closed chamber at the end of said cylinder containing an elastic gas to be subjected to pressure transmitted through said fluid by said piston, the normal volume of said gas being so proportioned with respect to the volume of said fluid that the piston may move a predetermined distance without developing a compression resistance by said gas materially interfering with the movement of the piston, means for increasing the displacement of the piston relatively to the cylinder, after said predetermined movement whereby the compression resistance of the gas through movement of the piston will rapidly increase beyond such predetermined distance of movement.

2. In a device of the class described, the combination of a cylinder, a plunger operable in said cylinder, there being a liquid between said plunger and the cylinder end, a chamber communicating with the cylinder end and containing an elastic gas, said gas by its resistance to change of volume during travel of the plunger resisting the movement of the plunger, the volume of said gas chamber being so proportioned with respect to the cylinder that during predetermined movement of said plunger said gas will not develop any material resistance to such movement said plunger being mounted for relatively increased displacement in said cylinder after said predetermined movement, whereby the compression of the gas will rapidly increase beyond said predetermined movement.

3. In a device of the class described, the combination of a cylinder, a plunger reciprocable in said cylinder, means operating said plunger relatively to the cylinder, a closed chamber communicating with the end of said cylinder and containing an elastic gas, a liquid in said cylinder between said plunger and said chamber for communicating the movement of said plunger to the enclosed gas to cause compression or expansion thereof, the normal volume of said gas being so proportioned that its compression or expansion will not materially interfere with predetermined small movements of the plunger but will rapidly increasingly resist greater movement, said plunger being mounted for increasingly further movement in proportion to the displacement of its operating means beyond said small movements.

4. In a shock absorbing device, the combination of a cylinder containing a liquid, a plunger operable in said cylinder, an elastic gas in said chamber connected with said cylinder above the liquid level therein and containing an elastic gas to be subjected to compression when said plunger travels, the normal volume of said gas being proportioned relative to the cylinder that oscillation of said plunger through comparatively short amplitude will not be materially resisted by said gas but greater movement of the plunger will be rapidly increasingly resisted by the gas, and a restricted relief path from one side of the plunger to the other for modifying the resistance of said gas to the plunger movement, and means normally ineffective during the major movement of the plunger but operable for automatically closing said relief path when said plunger has to traverse the major portion of its movement.

5. In a shock absorber for vehicles, the combination of a cylinder element and a plunger element reciprocable therein, said elements being adapted for connection one with the vehicle chassis and the other with the vehicle axle, a liquid in said cylinder, a closed chamber communicating with each end of the cylinder, said chambers containing elastic gas to be subjected to compression or expansion as the plunger reciprocates to thereby resist the movements of said plunger, said plunger having a restricted relief path therethrough for connecting one end of the cylinder with the other for the interflow of liquid, liquid flow through said path modifying the retardation effect of said gas relative to the plunger during movement of the plunger to cause volume change of said gas, and means normally ineffective during the major movement of the plunger, but operable for automatically closing said relief path to cause the final movement of said plunger to be resisted entirely by said gas.

6. In a shock absorber for vehicles, the combination of a cylinder element and a piston element movable therein, said elements being adapted for connection, one with the vehicle chassis and the other with the vehicle axle, a liquid in said cylinder, a closed chamber communicating with each end of the cylinder, said chambers containing elastic gas to be subjected to compression or expansion as the piston reciprocates whereby to resist movement of the plunger, said piston being mounted for a definite rate of displacement relatively to the cylinder during predetermined small movements of the axle relatively to the vehicle chassis, and for relatively increasingly greater displacement during increasing movement of the axle relatively to the chassis.

RICHARD S. M. MITCHELL.
GERTRUDE ALBIN MITCHELL.